H. A. MARTIN.
AUDITING MACHINE.
APPLICATION FILED JUNE 20, 1914.
1,261,147.
Patented Apr. 2, 1918.
4 SHEETS—SHEET 1.
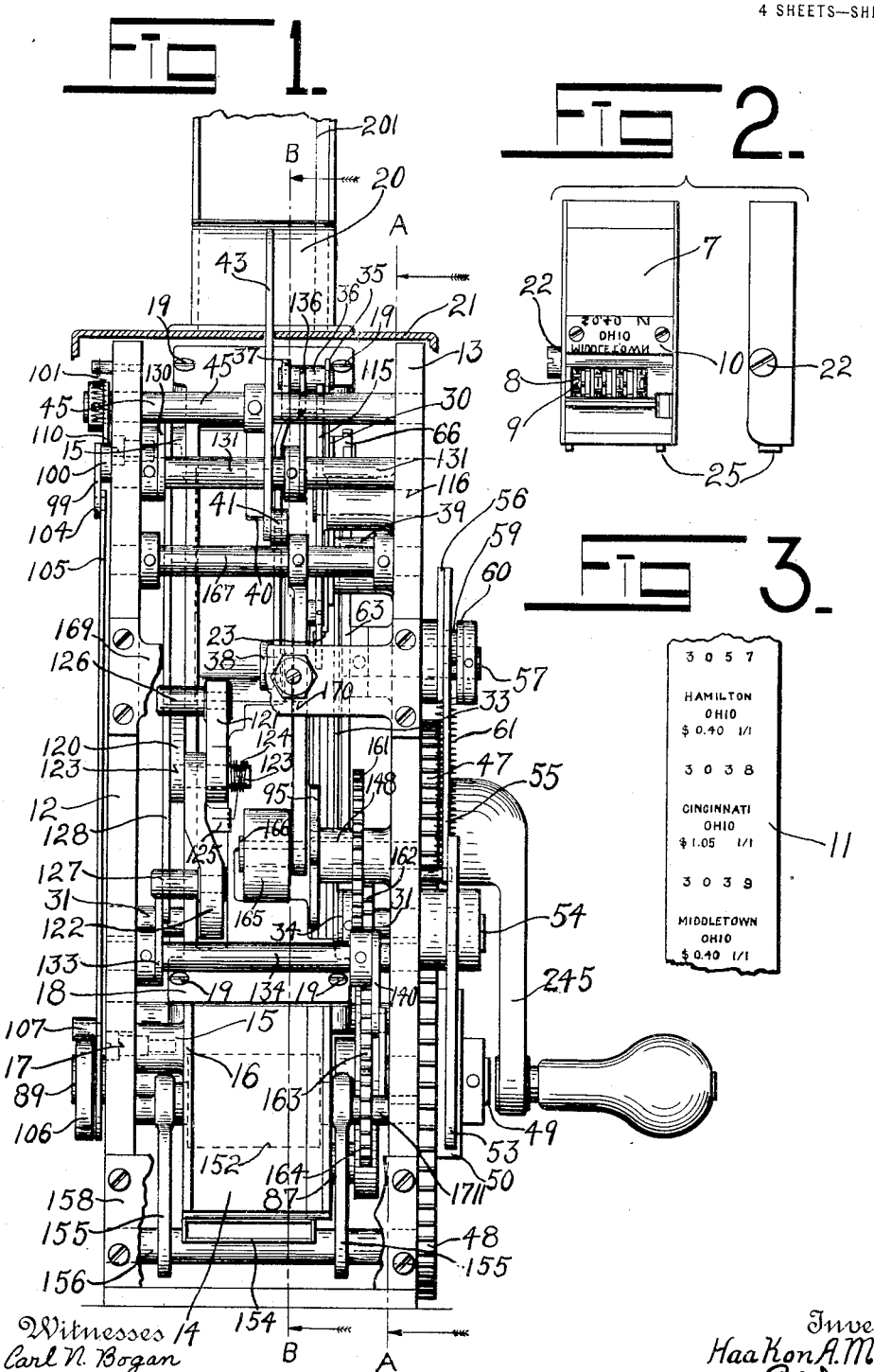
Witnesses
Carl N. Bogan
E. W. Lindsey Jr.
Inventor
HaaKon A. Martin.
by R. C. ...
Carl Beust
Attorneys

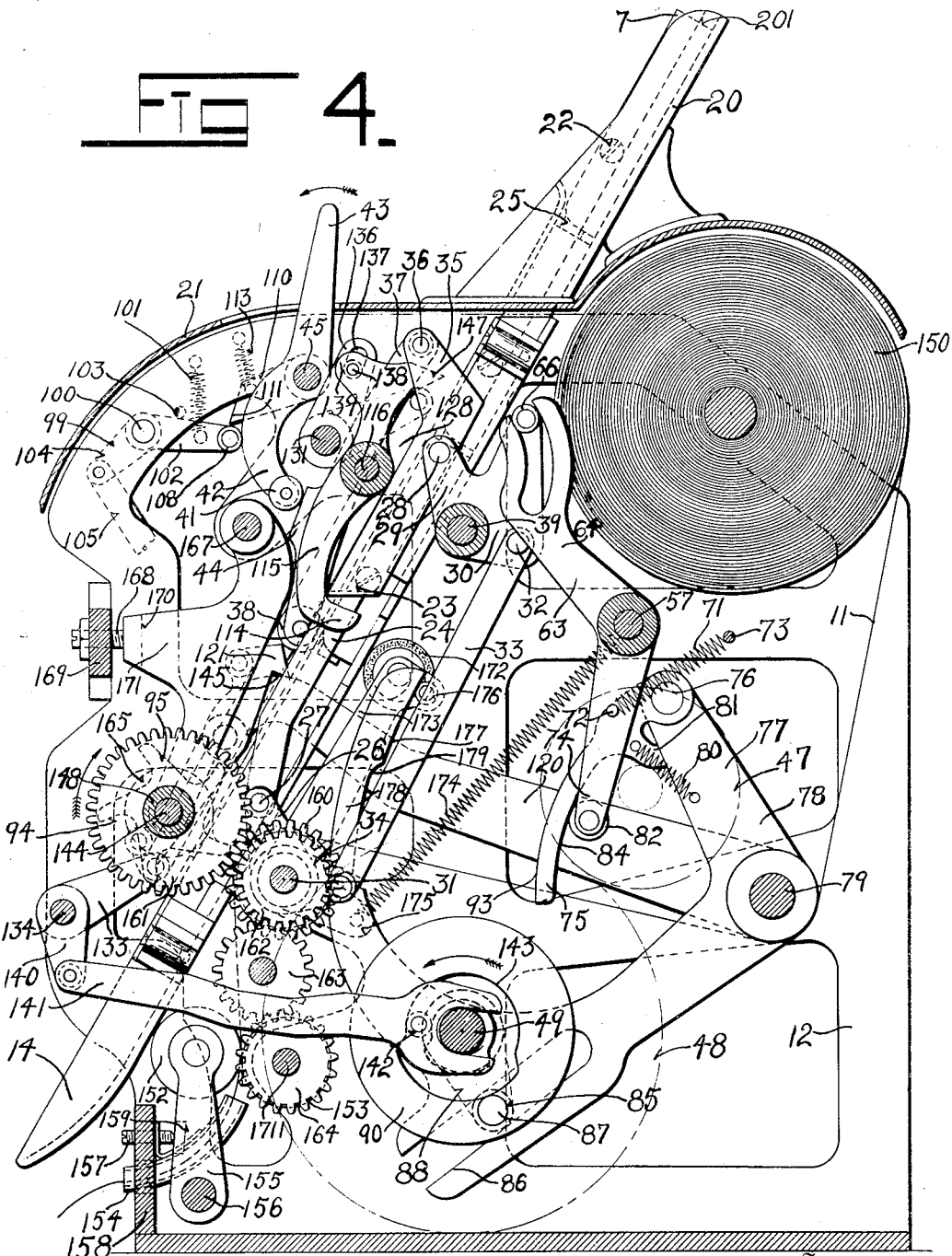

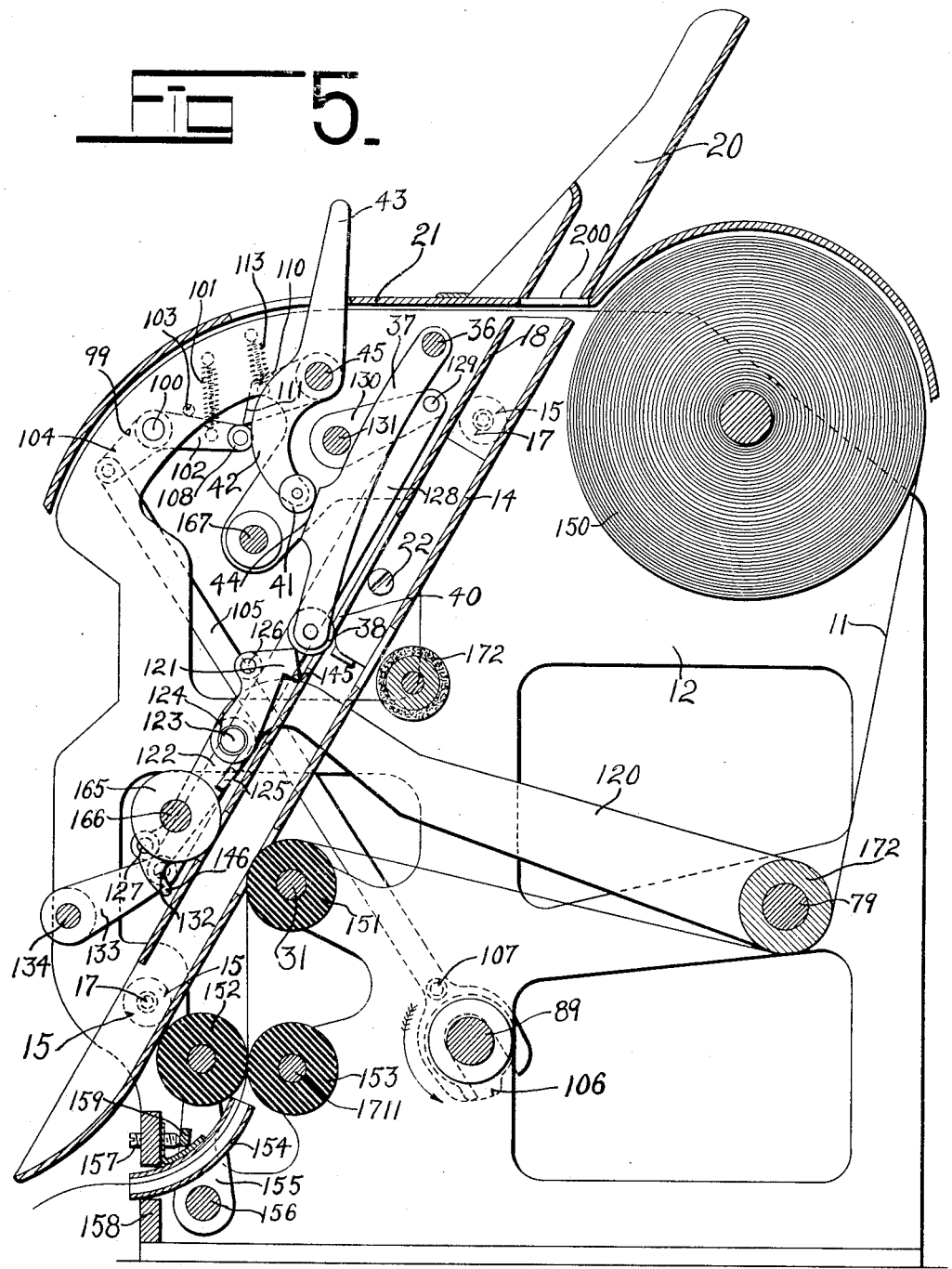

H. A. MARTIN.
AUDITING MACHINE.
APPLICATION FILED JUNE 20, 1914.

1,261,147.

Patented Apr. 2, 1918.
4 SHEETS—SHEET 4

Witnesses
Carl N. Bogan.
H. W. Lindsey Jr.

Inventor
Haakon A. Martin.
by
Carl Beust
Attorneys

UNITED STATES PATENT OFFICE.

HAAKON A. MARTIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

AUDITING-MACHINE.

1,261,147.   Specification of Letters Patent.   Patented Apr. 2, 1918.

Application filed June 20, 1914. Serial No. 846,222.

*To all whom it may concern:*

Be it known that I, HAAKON A. MARTIN, a citizen of the United States, residing at Dayton, in the county of Montgomery and State of Ohio, have invented certain new and useful Improvements in Auditing-Machines, of which I declare the following to be a full, clear, and exact description.

This invention relates to printing mechanism and more particularly to a machine adapted to make a record in accordance with the positions of adjustable means carried in detachable devices or articles.

The principal object of this invention is to construct a machine adapted for auditing uses in connection with systems employing a plurality of detachable devices, each of which is provided with accounting means.

Another object of the invention is to so construct the operating mechanism of the machine that its operation is controlled by the detachable devices.

The present invention and substantial parts thereof are capable of various uses other than that in the disclosed embodiment wherein the invention is applied particularly to a machine adapted for use in connection with a machine such as that shown and described in a co-pending application for Letters Patent of the United States, filed by the present applicant February 6, 1915, Serial No. 6490.

The principal object of this invention therefore is to construct a printing mechanism adapted to make a detailed record from the detachable destination devices, disclosed in the above mentioned copending application of the present applicant on record material for auditing purposes.

The above mentioned co-pending application of the present applicant discloses a machine for printing and issuing tickets for railways, steamship lines or analogous uses. To issue local tickets, that is, tickets to stations comparatively near the issuing station, detachable destination devices are employed to coöperate with printing mechanism to print and issue tickets to the particular stations to which the destination devices are assigned. Each destination device carries a consecutive numbering device, which is operated whenever the particular destination device is employed to print on a ticket. The consecutive numbering devices print on the tickets issued by the machine disclosed in the copending application, but no means is provided for making a record for auditing purposes of the number of tickets issued to each particular station. The machine embodying the present invention is designed to perform this function by printing on a record strip from the consecutive numbering devices and printing plates carried by the destination devices when the latter are passed through the machine.

As an incident to the design of an efficient machine of the type disclosed herein, the locking means for the operating mechanism is constructed to be controlled by the destination devices, so that the machine can be operated only when a destination device is present in the machine and is automatically locked when the last of any number of destination devices inserted before and during an operation of the machine, is ejected from the machine.

While the machine in the preferred form of embodiment disclosed herein is adapted for use more particularly to print from printing means carried by destination devices it is clear that the invention is capable of use in other embodiments, such as in connection with a system employing cash and credit registers of the types disclosed in Letters Patent of the United States, issued to Edmund S. Church, on April 20, 1915, Serial No. 1,136,101, wherein detachable total retaining devices having adjustable denominational slides whose positions represent amounts are shown.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of the said drawings:

Figure 1 is a front view of the machine embodying the present invention, the cabinet and part of the cross bars of the supporting frame being shown broken away to expose the construction of the machine clearly to view.

Fig. 2 shows a bottom and a side view of one of the destination devices in connection with which the present invention is used.

Fig. 3 is a view of a portion of the audit strip used in the machine, showing an audit of the different destination devices.

Fig. 4 is a transverse vertical section taken on the line A—A of Fig. 1 and looking to the left.

Fig. 5 is a transverse vertical section taken on the line B—B of Fig. 1 and looking to the left.

Figure 6:
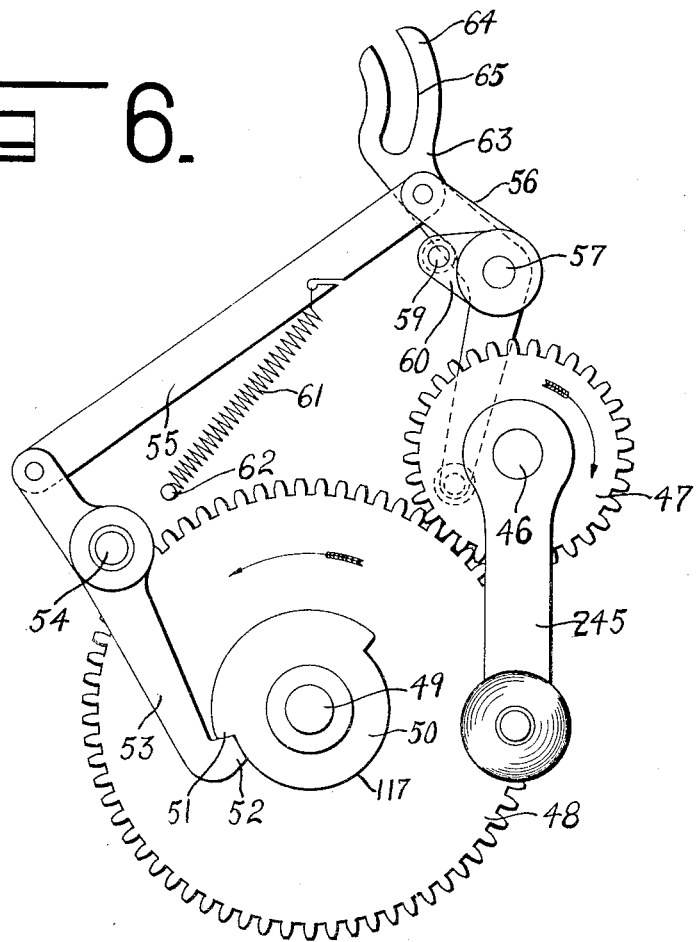
Fig. 6 is a detail view in side elevation of the operating mechanism and the locking device therefor.

The destination devices 7 (Fig. 2) are fully shown and described in the above mentioned copending application of the present applicant and reference may be had thereto for a detailed description of the same. In general the devices are in the form of small detachable boxes. Each destination device carries a consecutive numbering device 8 comprising a plurality of printing wheels 9, which are actuated to add one thereon when the destination device is employed to print on a ticket issued by the ticket issuing machine disclosed in the aforesaid copending application. Each destination device is provided also with a printing plate 10 for printing the name of the destination station, the class and the price on the tickets issued by the ticket issuing machine when the particular destination device is used. In the present invention the consecutive numbering devices 8 and the printing plates 10 of the destination devices print on an audit strip 11, as shown in Fig. 3, when the destination devices are moved through the machine disclosed herein.

The machine in the preferred form shown in the drawings embodies two side frames 12 and 13 which serve to support the various parts of the machine. A chute 14 within the machine (Figs. 1, 4 and 5) at its left hand side 16 is provided with lugs 15 (Figs. 1 and 5) and the lugs are rigidly fastened by screws 17 to the side frame 12 for the purpose of supporting the chute. The top plate 18 of the chute within the machine is fastened to the sides 16 thereof by screws 19. The portion 20 of the chute outside of the machine is separate from the chute within the machine and is rigidly mounted on the top of the cabinet 21 of the machine in alinement with the main portion of the chute, so that the destination devices, when inserted, may pass directly from the portion 20 of the chute through an opening 200 (Fig. 5) in the cabinet into the chute within the machine.

The destination devices 7 are inserted into the chute with their forward ends, that is, the ends in which the numbering devices 8 are mounted (the lower end in Fig. 2), first and the printing plates 10 facing the rear of the machine. The chute on its inner and upper right hand side is provided with a guide 201 (Figs. 1 and 4) upon which a stud or screw 22 of a destination device slides as the latter moves down the chute. This guide is provided to prevent the devices being inserted upside down or with their rear ends first. If it be attempted to insert a device with its rear end first the stud abuts the upper end of the guide 201, and if upside down the stud engages the upper end of the left hand side of the chute and thus prevents insertion of the device. Movement of the first destination device inserted is arrested by the engagement of its screw 22 projecting from its right hand side with a bent portion 23 of a bar 24 (Figs. 1 and 4). Projecting pieces 25 on the front ends of each of the remaining destination devices placed in the chute abut the upper end of the preceding destination device. The bar 24 (Fig. 4) at its lower end is pivotally secured to an arm 26 by a pin 27 and at its upper end is pivoted by a pin 28 to an arm 29 of a plate 30. The arm 26 and the plate 30 respectively are mounted loosely on a shaft 31, suitably mounted in the side frames 12 and 13, and a stud 39 projecting from the frame 13. The plate 30 is pivotally connected at 32 to a link 33 which, at its lower end, is pivotally connected to the outer end of an arm 34 loosely mounted on the shaft 31 but rigid with the arm 26. The bar 24 at its upper end has an arm 35 which is pivoted by a pin 36 to an arm 37 (Figs. 1, 4 and 5) which is free at its lower end and carries a roller 38. The roller 38 normally projects into a slot 40 formed in the top plate 18 of the chute 14 so that the forward ends of the destination devices engage the roller and slightly rock the arm 37 clockwise about its pivot 36 as the devices pass down the chute. A roller 41, mounted on the lower end of a downwardly extending arm 42 of a hand lever 43 fast on a shaft 45 is adapted to coöperate with a shoulder 44 on the arm 37.

From the above construction it can be seen that when the hand lever 43 is gripped by the operator and rocked counter clockwise, the roller 41 will not engage the shoulder 44 on the arm 37 if a destination device is not in the chute as the presence of a destination device is necessary to raise the arm 37, so that its shoulder 44 engages the roller 41, as shown in Figs. 4 and 5. If a destination device is in the chute, however, the roller 38 serves as a fulcrum for the arm 37 when the hand lever 43 is rocked clockwise as the roller 41 now engages the shoulder 44 and the roller 38 rests on the inserted destination device. In this manner the arm 37 is rocked clockwise about the pin supporting the roller 38 thereon and as the arm 37 is pivoted to the bar 24 at 36 the plate 30 and arms 26 and 34 are caused to rock in the same direction, the link 33 being provided to insure the rocking of the arms 26 and plate 30 to the same extent to swing the bar 24 upwardly and rearwardly.

Figure 7:
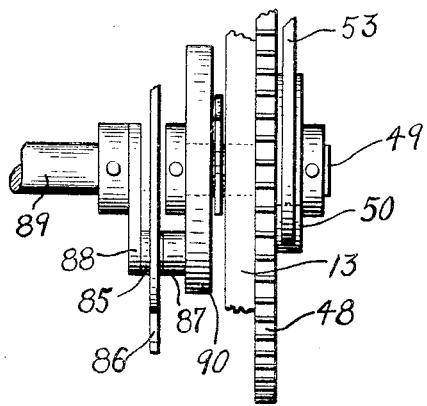
Fig. 7 is a detail view in front elevation of part of the driving mechanism shown in Figs. 1 and 4.

This clockwise movement of the plate 30, effected by the operation of the hand lever 43, when a destination device is inserted into the machine, releases the operating mechanism, shown in Figs. 1 and 6 and 7, to permit the operation of the machine. This operating mechanism comprises a hand crank 245 loosely mounted on a stud 46 projecting laterally from the side frame 13. Although this hand crank is shown in the drawings it is not intended to limit the invention to use with such operating device as it is evident that other forms of operating means, such as a motor, may be employed. A gear 47 is rigid with the hand crank 245 and meshes with a gear 48 which has twice as many teeth as gear 47 so that two rotations of the crank 245 and gear 47 are necessary to give the gear 48 and a shaft 49, on which the gear 48 is rigidly mounted, one complete rotation. Fast on the shaft 49 and beside the gear 48 is a disk 50, having a locking shoulder 51. A nose 52 on the lower end of a lever 53 pivoted at 54 to the frame 13 normally engages the shoulder 51 on the disk 50 to lock the machine against operation. The lever 53 at its upper end is pivoted to the lower forward end of a link 55 which at its opposite end is pivoted to an arm 56 loosely mounted on a short shaft 57 journaled in the side frame 13. A pin 59 on an arm 60 fast on the shaft 57 projects under the arm 56. A spring 61 which is connected at one end to a pin 62 on the frame 13 and at its opposite end to the link 55 normally serves to retain the lever 53 in locking position, as shown in Fig. 6. A lever 63 (Figs. 1, 4 and 6) is mounted rigidly on the left hand end of the shaft 57 and its upwardly extending arm 64 is provided with a cam slot 65, through which a roller 66 projecting from the plate 30 passes. The cam slot 65 is so designed that when the plate 30 is rocked clockwise upon operation of the hand lever 43 when a destination device is in the chute, the lever 63, shaft 57 and arm 60 are rocked clockwise so that the pin 59 will engage the arm 56 and rock it clockwise. This movement of the arm 56 through the link 55 rocks the lever 53 so that its nose 52 is carried out of engagement with the shoulder 51 on the disk 50 to permit operation of the crank handle to operate the machine. A spring 71 (Fig. 4) which is connected at one end to a pin 72 on the downwardly extending arm 74 of the lever 63 and at its opposite end to a cross rod 73 serves to retain the lever 63, plate 30 and the above described coöperating parts in normal position and to restore these parts to normal position at the end of the operation of the machine after the last of any number of destination devices inserted before or during the operation has been ejected.

The operating mechanism may be continually operated so long as the destination devices are continuously inserted in the machine as means are provided to hold the lever 53 out of locking position until after the destination device last inserted is ejected from the machine. This means, which is to be described now is so constructed that the hand lever 43 is operated but once to release the operating mechanism, the operator being permitted to remove his hand immediately after he has drawn the hand lever forward to releasing position.

This means comprises a curved arm 75 (Fig. 4) pivoted at 76 to an upwardly extending arm 77 of an operating frame 78 rigidly mounted on a shaft 79. A spring 80, which is secured at its end to the arms 75 and 77, normally holds the end of a finger 81 on the arm 75 in engagement with the forward edge of the arm 77. A roller 82 on the downwardly extending arm 74 of the lever 63 normally engages the rear concave edge 84 of the arm 75 so that when the lever 63 is rocked clockwise to release the machine, the arm 75 is rocked forwardly about its pivot 76 by the roller 82 and against the action of the spring 80. The frame 78 is provided with a slot 86 (Figs. 4 and 7) through which an antifriction roller 85 passes, the roller 85 being carried by a cross rod 87 which rigidly connects the outer end of an arm 88 fast on a shaft 89 and a disk 90 fast on the shaft 49. The shaft 89 is supported suitably in bearings in the side frame 12 and is in direct alinement with the shaft 49 which is supported suitably by the side frame 13 and carries the gear 48. As the cross rod 87 rigidly connects the arm 88 and the disk 90 it can be seen that the shafts 49 and 89 rotate as a unit. It is obvious from the above description that upon each rotation of the shafts 49 and 89 in the direction of the arrow (Fig. 4) the cross rod 87 operates in the slot 86 and rocks the operating frame 78 first clockwise and then counter clockwise to normal position. The movement of the operating parts of the machine during one complete rotation of the shafts 49 and 89 is called a cycle of operation herein, and the variable number of continuous cycles of operation is called an operation of the machine. Near the end of the clockwise movement of the frame 78 during the first rotation of the shafts 49 and 89, the arm 75 passes out of engagement with the roller 82 and the spring 80 immediately rocks the arm 75 counter clockwise into normal position relative to the arm 77 of the frame 78. Then upon return movement of the frame 78 to normal position the roller 82 engages the convex forward edge 93 of the arm 75 so that the spring 71 is prevented from returning the lever 63, plate 30, bar 24, arm 60 and the correlated parts to normal position during the return movement of the frame 78 and until near the end of the next clockwise movement of the frame 78 from normal position, if but one destination device remains in the chute. The means for ejecting a destination device from the chute at each rotation of the shafts 49 and 89 will be described later. The last destination device to be ejected from the machine is not in engagement with the roller 38 during the last rotation of the shafts 49 and 89 as it has been lowered in the chute at the preceding rotation so that its stud 22 engages one of the fingers 94 of a star wheel 95, as will be presently described. So long as there are two destination devices in the chute, the stud 22 of one of the devices being in engagement with a finger 94 on the star wheel 95 the lever 63 is prevented from rocking counter clockwise back to normal position, when the lower end of the arm 75 is elevated above the roller 82 after the first rotation of the shafts 49 and 89. The manner in which this result is accomplished also will be described later, it being expedient to describe now the means for permitting the operator to remove his hand from the hand lever 43 immediately after its operation and for holding the lever 63 against movement in a counter clockwise direction to normal position until after the arm 75 is lowered sufficiently during the first rocking movement of the frame 78 to move its forward edge 93 behind the roller 82.

Referring to Figs. 1, 4 and 5, the means for holding the lever in moved position after the arm 75 is lowered the first time behind the roller 82 includes a lever 99 loosely mounted on a stud 100 projecting laterally from the side frame 12. A spring 101, which is attached at its ends to the rearwardly extending arm 102 of the lever 99 and to the frame 12, is employed to retain the lever 99 in engagement with a pin 103 on the frame 12. The arm 104 of the lever 99 is pivotally connected to the upper end of a pitman 105 which at its lower end (Fig. 5) is forked to straddle the shaft 89. The shaft 89 to the left of the frame 12 rigidly carries an open cam 106 (Figs. 1 and 5) for coöperating with a roller 107 on the pitman 105 to raise the latter. The arm 102 of the lever 99 carries a roller 108 normally engaging the outer end of the lower edge of an arm 110 fast on the shaft 45 to the left of the frame 12.

When the hand lever 43 is pulled forward to release the machine as already described, the arm 110 by its engagement with the roller 108 rocks the lever 99 clockwise until the lower edge of the arm 110 passes out of engagement with the roller 108 when the spring 101 restores the lever 99 to normal position. As the operator removes his hand from the hand lever 43 the latter is moved very slightly in a clock-wise direction by a spring 113, this movement being limited by the engagement of the forward inclined edge 111 of the arm 110 with the roller 108. The construction of the cam 106 and its arrangement on the shaft 89 is such that the cam engages the roller 107 on the pitman 105 to raise the latter and rock the lever 99 clockwise immediately after the lower end of the convex edge 93 of arm 75 is lowered into engagement with and to the rear of the roller 82 on the lever 63 during the first operation of the frame 78. The roller 108 in this manner is moved down out of engagement with the edge 111 of the arm 110 to permit a spring 113 to rock the arm 110, shaft 45 and lever 43 to normal position. Movement of the lever 43 to normal position permits the first inserted destination device to drop a slight distance in the chute until it is arrested by the engagement of its stud 22 with a nose 114 (Fig. 4) of a lever 115 mounted on the stud 116 projecting from the side frame 13. In this position of the destination device its stud 22 engages the forward edge of the bar 24 immediately below the bent portion 23, the bar 24 having been swung upwardly and rearwardly by the operation of the hand lever 43 as above stated. The destination device probably would not move into this position until the lever 43 is restored to normal position as the device before this time is held frictionally between the roller 38 and the bottom of the chute, but when the lever 43 is restored the roller 38 is not firmly held against the top of the destination device and the device is permitted to move.

The mechanism for moving the destination devices through the chute 14 will be hereinafter described. However, the movement of the devices will be referred to in a general way in order to bring out clearly the action of the parts here referred to. When the first destination device moves downward its stud engages the nose 114 of the lever 115. The latter is subsequently rocked clockwise so that the nose 114 moves out of engagement with the stud 22 of the first device, and the edge of the upper end 147 of the lever 115 passes under the stud 22 on the destination device resting on the first destination device, to hold the second device in this position until the first device is moved down in the chute in a manner to be presently described. The stud 22 on the first destination device engages one of the fingers 94 on the star wheel 95 and remains in that position until the next operation of the operating device. When the lever 115 is restored to normal, which occurs near the end of each rotation of the shafts 49 and 89 as will be soon described, the second destination device is released and falls down the chute until it is arrested by the engagement of its stud 22 with the nose 114 of the lever 115. Upon the next operation of the operating device the second destination device is moved down the chute and the first is forced out of the machine.

As the stud 22 of the second destination device engages the forward edge of the bar 24 it slides thereon and the bar 24 cannot be moved forward by the spring 71, through the lever 63 and plate 30, when the arm 75 is raised out of engagement with the rollers 82 on the lever 63. Therefore the forward edge 93 of the arm 75 is again lowered into engagement with and to the rear of the roller 82 so that the lever 63 will not be rocked back to normal to permit the lever 53 to be restored to locking position after the stud 22 of the second destination device slides out of engagement with the forward edge of the bar 24 and before the stud 22 of the third destination device engages the nose 114 of the lever 115 and rests on the forward edge of bar 24. This operation is repeated at each cycle of operation of the machine so long as two destination devices remain in the machine at the beginning of each cycle of operation.

When the last destination device is ejected from the machine the spring 61 (Figs. 1 and 6) is permitted to return the lever 53 to normal position so that its nose 52 engages the shoulder 51 of the disk 50 at the end of the rotation of this disk to lock the machine against further operation. It can be seen that this movement of the lever 53 will occur at this time as the last destination device has been lowered so that its stud 22 engages a finger 94 of the star wheel 95. Therefore, during the last cycle of operation no stud 22 of a destination device engages the forward edge of the bar 24 and the spring 71 rocks the arm 63 and therefore the plate 30 and the arm 26 counter clockwise when the arm 75 is raised out of engagement with the roller 82 on the lever 63. In this manner the stud 59 is carried down out of engagement with the lower edge of the arm 56, the arm 60 being fast on the shaft 57, and the spring 61 rocks the lever 53 counter clockwise until its nose 52 engages the circular portion 117 of the periphery of the disk 50. Then at the end of the rotation of the disk 50 the shoulder 51 will engage the nose 52 on the lever 53 and lock the machine against further operation.

The means for moving the destination devices through the chute will now be described. An arm 120 (Figs. 1, 4 and 5) is rigidly mounted on the shaft 79 and carries at its forward end a gripping device comprising an upwardly extending arm 121 and a downwardly extending arm 122 both of the arms being pivotally mounted on the arm 120 by a pin 123 and being capable of movement about said pin independent of each other. As shown in Figs. 1 and 5 a spring 124 is coiled about the pin 123 to the right of the arm 121 and one end of the spring is bent over the front edge of the arm 121 and the other end is bent over a lug 125 on the arm 122. The spring 124 tends to rock the free ends of arms 121 and 122 rearwardly and in opposite directions and thereby serves to retain a stud 126 on the arm 121 and a stud 127 on the arm 122 in engagement with the forward edge of a link 128. The link 128 at its upper end is pivoted by a pin 129 to an arm 130 fast on a shaft 131 and the lower end of the link is pivoted at 132 to an arm 133 fast on a shaft 134. The shafts 131 and 134 are suitably supported by the side frames 12 and 13. Rigidly mounted on the shaft 131 is an arm 136 provided with a slot 137 (Fig. 4) through which a stud 138 mounted on a forwardly projecting portion 139 of lever 115 passes. Rigidly mounted on the shaft 134 is a downwardly extending arm 140 which at its lower end is pivoted to the forward end of a pitman 141. This pitman at its rear end is bifurcated to straddle the shaft 49, and also carries a roller 142 projecting into a cam groove 143 formed in the right hand face of the disk 90.

The operation of the mechanism described in the preceding paragraph is as follows: The arm 120, being fast on the shaft 79, rocks first clockwise and then counter clockwise to normal position with the operating frame 78. At the beginning of each counter clockwise movement of the arm 120 and as soon as the lower end of the arm 75 is lowered behind the roller 82, the cam groove 143 moves the pitman 141 forwardly thereby rocking the arm 140, the shaft 134 and the arms 133 clockwise and through the medium of the link 128 also moves the arm 130 clockwise and thus moves said link 128 rearwardly and downwardly. When the link 128 is given this movement the spring 124 at the same time rocks the arms 121 and 122 rearwardly about their pivot 123. As the forward end of arm 120 is then in raised position a hook or shoulder 145 on the arm 121 in this manner is moved into engagement with the upper end of the destination device whose stud 22 then engages the nose 114 of the lever 115, and a curved nose 146 on the lower end of the arm 122 is moved to engage over the curved lower end of the destination device. The arms 121 and 122 in this way firmly grip the destination device so that the device is moved downwardly in the chute upon return movement of the arm 120 to normal position. Near the very end of the rotation of the disk 90 and at the instant the stud 22 on the destination device is moved into engagement with one of the fingers 94 of the star wheel 95 the cam groove 143 through the pitman 141, arm 140, shaft 134, arm 133, link 128 and arm 130, moves the link 128 upwardly and forwardly to normal position. As the link 128 is engaged by pins 126 and 127 on the arms 121 and 122 respectively these arms are rocked forward to normal position by this movement of the link 128 to carry the shoulder 145 of the arm 121 and the nose 146 of the arm 122 out of gripping engagement with the destination device. The arms 121 and 122 are not moved rearwardly into gripping position until after the cam 106 (Fig. 5) has operated the pitman 105 and lever 99 to permit the hand lever 43 to be returned to normal position in order to allow the force of gravity to move the first inserted destination device from the position shown in Fig. 4 to the position in which its stud 22 engages the nose 114 of the lever 115.

The lever 115 serves as an escapement to prevent the destination device resting on the destination device whose stud 22 engages the nose 114 of the lever 115 from following the latter device down in the chute, and retains the latter device in position until it is gripped by the arms 121 and 122. As the arm 136 is fast on the shaft 131 this arm is rocked clockwise when the link 128 is moved rearwardly and downwardly by the cam groove 143 and the lever 115, because of the slot and pin connection 137, 138 also is rocked clockwise. The lever 115 is so constructed that at the instant the arms 121 and 122 grip a destination device the nose 114 of the lever 115 moves out of engagement with the stud 22 on the gripped destination device and the upper end 147 of the lever moves under the stud 22 on the succeeding destination device. When the lever 115 is rocked counter clockwise to normal position near the end of each rotation of the cam disk 90, the upper end 147 of the lever 115 is carried out of engagement with the stud 22 of the destination device held by this end of the lever and this destination device then falls down the chute until it is stopped by the engagement of its stud 22 with the nose 114 of the lever 115.

From the above description it can be seen that as each destination device is moved down the chute, its stud 22 engages a finger 94 of the star wheel 95, it being retained in this position by the star wheel until the succeeding destination device is moved down the chute. As each succeeding device is moved downward into this position the lower end of the nose 146 of the arm 122 engages the preceding device whose stud 22 engages the star wheel 95 and thereby forces the preceding device past the star wheel 95 after which the device drops out of the machine.

The star wheel 95 is rigidly mounted on a sleeve 148 (Figs. 1 and 4) encircling a stud 144 projecting from the left hand side of the frame 13, and is given one step of movement, that is one fifth of a rotation, by the engagement of one of its fingers 94 with the stud 22 on a destination device as the device is moved past the star wheel and out of the chute. The star wheel 95 is employed to feed the audit strip 11 through mechanism which is shown in Figs. 4 and 5 and now to be described.

The audit strip 11 passes from a supply roll 150 under a roller 172 (Fig. 5) loose on the shaft 79, over an impression roll 151 fast on the shaft 31, between coöperating feeding rolls 152 and 153, and through a guide 154 out of the machine. The feeding roll 152 is mounted in a frame 155 which is loosely mounted on a cross rod 156. A screw 157, mounted in a cross bar 158, which supports the guide 154, engages a cross bar 159 of the frame 155 and may be adjusted so that the proper amount of pressure for feeding the strip exists between the coöperating feed rolls 152 and 153. Fast on the shaft 31 is a gear 160 (Fig. 4) which meshes with a gear 161 (Figs. 1 and 4) fast on the sleeve 148 carrying the star wheel 95. A second gear 162 also fast on the shaft 31 meshes with an intermediate gear 163 which in turn meshes with a gear 164 rigidly mounted on the shaft 1711 carrying the feeding roll 153. It can therefore be seen that as the destination devices pass the impression roll 151 their studs 22 engage and rotate the star wheel 95 and the latter through the above described gearing imparts its movement to the feeding rolls 152 and 153 to feed the audit strip.

At the same time the consecutive numbering devices 8 and the printing plates 10 of the destination devices print on the audit strip 11 (Fig. 3). A roller 165 (Figs. 1, 4 and 5) loosely mounted on a stud 166 carried by the lower end of an arm 171 fast on a shaft 167. As the destination devices pass between the roller 165 and the impression roll 151, the roller 165 firmly holds the device against the audit strip 11. A screw 168 (Fig. 4) which passes through a cross bar 169 is provided to adjust the arm 171 and roller 165 so that the roller 165 exerts the proper pressure on the destination device to make perfect impressions on the audit strip 11.

The consecutive numbering devices 8 and printing plates 10 are inked by an inking roller 172 as the destination devices are moved down the chute. This inking roller is carried by a bell crank lever 173, which is loosely mounted on the shaft 31. A spring 174 connected at on end to the rearwardly extending arm 175 of the lever 173 and at its opposite end to the shaft 57, tends to rock the lever 173 counter clockwise but this movement is normally prevented by the engagement of a roller 176 mounted on the lever 173 and near the inking roll, with a curved edge 177 of an upwardly extending arm 178 of the frame 78. A notch or cut away portion 179 of the arm 178 is moved in front of the roller 176 during the operation of the frame 78 so that the spring 174 is permitted to rock the lever 173 to carry the inking roll 172 into inking position while the destination devices are moving down the chute.

*Operation.*

The operation of the machine as a whole may be briefly recapitulated. The auditor operating the machine first places several destination devices in the chute and then operates the hand lever 43 to release the machine. During the operation of the machine additional destination devices are inserted so that there are always at least two devices in the chute at the beginning of each cycle of operation (except the last cycle) thereby enabling the auditor to continually operate the crank handle 245 until the last destination device, to be audited, is ejected from the machine. It is of course to be understood that an audit may be taken from only one destination device, or that the several devices may be run through singly if desired, but it is preferable that several be started through and that at least two be in the chute at all times so as to enable a continuous operation without repeated manipulation of lever 43.

Movement of the lever 43 to releasing position rocks the arm 37 about the roller 38, which rests on the first inserted destination device. As the arm 37 is pivoted to the bar 24 the latter is moved upwardly and rearwardly swinging the plate 30 and the arm 26 clockwise about their pivotal centers. When the plate 30 is given this movement the roller 66 on the plate moves in the slot 65 in the lever 63 and rocks the lever 63, shaft 57, arm 60, arm 56 and lever 53 clockwise to move the locking nose 52 of the lever 53 out of engagement with the shoulder 51 in the disk 50 thereby permitting operation of the crank handle 245. The lever 43 is retained in operated position by the engagement of the roller 108 with the edge 111 of the arm 110 until upon the operation of the machine the cam 106 rocks the lever 99 through the pitman 105 to permit the spring 113 to return the lever 43 to normal position.

Near the end of the first upstroke of the frame 78, effected by the first movement of the rod 87 which connects the arm 88 and disk 90, the arm 75 is raised out of engagement with the roller 82 and the spring 80 rocks the arm 75 rearward. During the return stroke of the frame 78 the arm 75 moves in the rear of the roller 82 to prevent the lever 63 from being restored to normal position. Near the beginning of the return stroke of the arm 120 which is rigid with the frame 78, the cam groove 143 operates the pitman 141 and moves the link 128 downwardly and rearwardly. The spring 124 at the same time rocks the arms 121 and 122 rearwardly to grip the first destination device which when the lever 43 was restored to normal fell from the position shown in Fig. 4 to the position in which its stud 22 engages the nose 114 of the lever 115. The nose 114 of the lever 115, just as the destination device is gripped, is moved out of engagement with the stud 22 of the gripped device and its upper end at the same time moves under the stud 22 of the second inserted destination device. When the first destination device is moved so its stud 22 engages one of the fingers 94 of the star wheel 95 near the end of the return stroke of the arm 120 the link 128 is raised to move the arms 121 and 122 out of gripping position and the lever 115 is restored to normal position to permit the second destination device to fall down the chute until its stud 22 engages the nose 114 of the lever 115. When the second destination or any following device is in this position its stud 22 rests in front of the bar 24, and therefore the bar 24 and the locking mechanism for the machine cannot return to normal position when the arm 75 is raised above the roller 82 at each upstroke of the frame 78. As the second and each succeeding device is gripped and moved down the chute the lower end of the nose 146 of the arm 122 engages the rear end of the preceding device whose stud 22 engages the star wheel 95 and forces the preceding device between the roller 165 and impression roll 162 and out of the chute. As each device passes between this roller and roll it prints on the audit strip which is fed forward by the rotation of the star wheel 95 through the gearing shown in Fig. 4.

When but one destination device remains in the machine its stud 22 engages a finger 94 of the star wheel 95 at the beginning of the last cycle of operation. During the upstroke of the frame 78, the spring 71 rocks the parts moved by the lever 43 back to normal position when the arm 75 is raised out of engagement with the roller 82 and the spring 61 then rocks the lever 53 so that its nose 52 will engage the shoulder 51 of the disk 50 and lock the machine against further operation until another device is inserted in the chute and the lever 43 is operated again.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:

1. In a machine of the class described, the combination with a plurality of printing members for printing on record material, of means for taking impressions from said printing means, a main operating mechanism for said impression means capable of having a variable period of uninterrupted operation dependent as to extent on the number of printing members to be printed from at each particular operation, and means controlled by each of the members in turn for controlling the operating mechanism.

2. In a machine of the class described, the combination with a printing mechanism, of a plurality of printing devices coöperating therewith to effect the printing of records on record material, a main operating mechanism capable of having a variable period of uninterrupted operation dependent as to extent on the number of devices coöperating with said printing mechanism, and means controlled by each of the devices in turn for controlling the operating mechanism.

3. In a machine of the class described, the combination with a printing mechanism, of a plurality of members coöperating therewith to effect the printing of records on record material, means for successively feeding any number of said members into position to coöperate with said printing mechanism, operating mechanism for said means capable of having a variable period of uninterrupted operation dependent as to extent on the number of members to coöperate with said printing mechanism, and means acted upon by each of said members in turn for controlling the extent of movement of the main operating mechanism.

4. In a machine of the class described, the combination with a printing mechanism, of a plurality of detachable members successively insertible into the machine for coöperating with the printing mechanism to effect the printing of records on record material, means for successively feeding said members into a position to coöperate with said printing mechanism, operating mechanism for said means capable of having a variable period of uninterrupted operation dependent as to extent on the number of members inserted into the machine, and means acted upon by each of said members in turn for controlling the extent of movement of the main operating mechanism.

5. In a machine of the class described, the combination with a printing mechanism, of a plurality of insertible detachable members coöperating therewith to effect the printing of records on record material, a main operating mechanism capable of having a variable period of uninterrupted operation dependent as to extent upon the number of detachable members inserted into the machine, and locking means for said operating mechanism under the control of said detachable members.

6. In a machine of the class described, the combination with a printing mechanism, of a plurality of insertible detachable members coöperating therewith to effect the printing of records on record material, a main operating mechanism having a variable period of uninterrupted operation dependent as to extent on the number of detachable members inserted into the machine, manipulative means, and a normally effective locking device for said operating mechanism rendered ineffective by said manipulative means and retained in ineffective position by the inserted detachable members during the operation of the machine.

7. In a machine of the class described, the combination with a plurality of printing members insertible into the machine for printing on record material, of a main operating mechanism capable of having a variable period of uninterrupted operation dependent as to extent on the number of printing members to be printed from at each particular operation, and locking means for said operating mechanism under the control of said printing members.

8. In a machine of the class described, the combination with a plurality of detachable printing members insertible into the machine for printing on record material in the machine, of a main operating mechanism capable of having a variable period of uninterrupted operation dependent as to extent on the number of printing members inserted into the machine, and a locking device for said operating mechanism controlled by said printing members.

9. In a machine of the class described, the combination with a plurality of detachable printing members insertible into the machine for printing on record material in the machine, of means for successively feeding said members through the machine, operating mechanism for said means capable of having a variable period of uninterrupted operation dependent as to extent on the number of printing members to be fed through the machine, and a locking device for said operating mechanism under the control of said printing members.

10. In a machine of the class described, the combination with a plurality of detachable printing members insertible into the machine for printing on record material during the operation of the machine, of operating mechanism having a variable period of operation dependent on the number of detachable members inserted into the machine, a hand lever, and a normally effective locking device for said operating mechanism rendered ineffective by the operation of the hand lever and retained in ineffective position by the inserted printing members during an operation of the machine.

11. In a machine of the class described, the combination with a plurality of detachable printing members insertible into the machine to print on record material, of operating mechanism having a variable period of operation dependent on the number of detachable members inserted into the machine, a hand lever, and a normally effective locking device for said operating mechanism rendered ineffective by the hand lever in conjunction with the first inserted printing member, and retained in ineffective position by the inserted printing members during the operation of the machine.

12. In a machine of the class described, the combination with a plurality of detachable printing members insertible into the machine for printing on record material, of an operating mechanism capable of having a variable period of operation dependent upon the number of printing members inserted into the machine, a normally effective locking device for the operating mechanism retained in ineffective position by the inserted printing members at certain times during the operation of the machine, and means for retaining the locking device in ineffective position during the operation of the machine and at the times that this is not accomplished by the inserted printing members.

13. In a machine of the class described, the combination with a plurality of detachable printing members insertible into the machine for printing on record material, of an operating mechanism constructed to have a variable period of operation dependent upon the number of printing members inserted into the machine, a hand lever, a normally effective locking device for the operating mechanism rendered ineffective by the hand lever in conjunction with the first inserted destination device and retained in ineffective position by the inserted printing members at certain times during the operation of the machine, and means for retaining the locking device in ineffective position during the operation of the machine at the times that this is not accomplished by the inserted printing members.

14. In a machine of the class described, the combination with a chute, of a printing mechanism, detachable devices insertible into the chute for coöperating with the printing mechanism to effect the printing of records on record material when the detachable devices are moved in the chute, operating mechanism capable of having a varying number of continuous cycles of operations dependent upon the number of said devices inserted into the machine and adapted to move one device in the chute from a certain position at each cycle of operation, and a lever operated by the operating mechanism to permit movement of one device from said certain position at a time and prevent movement of the other inserted devices which are to be moved later in the chute.

15. In a machine of the class described, the combination with a chute, of a printing mechanism, a plurality of detachable devices, a number of which may be inserted into said chute for coöperating with the printing mechanism to effect the printing of records on record material, means for moving one of the insertible devices at a time in the chute from a certain position, operating mechanism therefor, and means, operated by the operating mechanism, for permitting but one of the inserted devices moving in the chute at a time, and preventing movement of the other inserted devices which are to be moved later by said means.

16. In a machine of the class described, the combination with a chute, of a printing mechanism, a plurality of detachable devices, a number of which may be inserted into the chute, for coöperating with the printing mechanism to effect the printing of records on record material, means for singly moving said devices in the chute from a certain position, and means for holding one device at a time in this certain position and for preventing the succeeding device moving into such position until after said preceding device has been moved by said moving means.

17. In a machine of the class described, the combination with a chute, of a printing mechanism, a plurality of detachable devices insertible into the chute for coöperating with the printing mechanism to effect the printing of records on record material, means for moving one device at a time in the chute from a certain position, operating mechanism therefor, and a lever operated by the operating mechanism, one end of the lever being in position to retain one device in said certain position until said means is to move the device, the lever being operated so that this end is moved out of retaining position when said device is to be moved and so that the other end of the lever is moved at the same time in the path of the succeeding inserted device to prevent its movement.

18. In a machine of the class described, the combination with a main operating mechanism, of a printing means, a plurality of printing members for coöperating with the printing means, connections whereby the said members control operations of the operating mechanism, and means operated by the main operating mechanism for automatically moving said printing members successively into coöperative relation with said controlling connections and printing means.

19. In a machine of the class described, the combination with a main operating mechanism, of a printing means, a plurality of printing members for coöperating with said printing means, connections whereby said members control the operating mechanism, and means operated by the main operating mechanism for automatically moving said printing members successively into coöperative relation with said controlling connections and printing means during the continued operation of the machine.

20. In a machine of the class described, the combination with a printing mechanism, of a plurality of detachable devices insertible into the machine for coöperating with said printing mechanism to effect the printing of records on record material, and means controlled successively by the inserted devices for successively gripping said inserted devices and moving them in the machine.

21. In a machine of the class described, the combination with a main operating device of a chute, a printing mechanism, a plurality of printing members insertible into said chute for coöperating with the printing mechanism, connections whereby said members successively control operations of the operating mechanism, and means operated by the main operating device for moving said printing members singly and successively into coöperative relation with said controlling connections and printing mechanism.

22. In a machine of the class described, the combination with a main operating device, of a chute, a printing mechanism, a plurality of printing members insertible into the chute for coöperating with the printing mechanism, connections whereby said members control the main operating device, and a gripping device operated by said operating device for engaging said printing members singly and successively and carrying them into coöperative relation with the controlling connections and printing mechanism.

23. In a machine of the class described, the combination with a main operating device, of a chute, a printing mechanism, a plurality of printing members insertible into said chute for coöperating with the printing mechanism, connections whereby said members control the main operating device, and means operated by the main operating device for moving said printing members singly and successively into coöperative relation with said controlling connections and printing mechanism during a continued operation of the operating device.

24. In a machine of the class described, the combination with a main operating device, of a chute, a printing mechanism, a plurality of printing members insertible into the chute for coöperating with the printing mechanism, connections whereby said members control the main operating device, and a gripping device operated by said operating device for engaging said printing members singly and successively and carrying them into coöperative relation with the controlling connections and printing mechanism during a continued operation of the operating device.

25. In a machine of the class described, the combination with a main operating mechanism, of a printing means, a plurality of detachable printing members for coöperating with the printing means, devices whereby said members control operation of the main operating mechanism, and means operated by the main operating mechanism for automatically moving said printing members successively into coöperative relation with said controlling devices and printing means and for successively ejecting said devices from the machine.

26. In a machine of the class described, the combination with a printing mechanism, of a plurality of printing members insertible into the machine for coöperating with the printing mechanism to print on record material, arms for gripping said members, means for moving said arms into and out of gripping position, means for bodily moving said arms to move said devices in the machine, and operating mechanism for both of said means.

27. In a machine of the class described, the combination with a printing mechanism, of a plurality of printing members insertible into the machine for coöperating with the printing mechanism to print on record material, arms for successively and singly gripping said devices, means for moving said arms into and out of gripping position and means for bodily moving said arms to move successively the gripped devices from one position to another, one of the arms being adapted to successively engage the devices moved into the last mentioned position to eject them from the machine.

28. In a machine of the class described, the combination with a printing mechanism, of a plurality of detachable devices insertible into the machine for coöperating with said printing mechanism to effect the printing of records on record material, two arms for successively gripping said inserted devices, and means having a variable period of operation dependent on the number of said devices inserted for bodily moving said arms to move said devices successively in the machine.

29. In a machine of the class described, the combination with a printing mechanism, of a plurality of detachable devices insertible into the chute for coöperating with said printing mechanism to effect the printing of records on record material, two arms for successively gripping said inserted devices, and means having a variable period of operation dependent on the number of said devices inserted for bodily moving said arms to move said devices successively in the machine, and a normally effective locking device for said moving means, retained in ineffective position by the inserted detachable devices to permit the variable operation of said means.

30. In a machine of the class described, the combination with a plurality of recording members movable within the machine to make records on an audit strip, of feeding means for the audit strip actuated by the recording members when the latter are moved in the machine.

31. In a machine of the class described, the combination with a plurality of recording members movable in the machine to make records on an audit strip, of feeding means for the audit strip actuated by the recording members when the latter are moved in the machine, and operating mechanism for moving said recording members and controlled by the recording members so that the operating mechanism may have a variable period of operation dependent on the number of recording members to be moved thereby at each operation.

32. In a machine of the class described, the combination with a printing mechanism, of a plurality of detachable devices insertible into the machine to coöperate with said printing mechanism to effect the printing of records on record material, and feeding means for said record material, actuated by the inserted detachable devices.

33. In a machine of the class described, the combination with a printing mechanism, of a plurality of detachable devices insertible into the machine to coöperate with said printing mechanism to effect the printing of records on record material, feeding means for the record material, actuated by movement of the detachable devices in the machine, and operating mechanism for moving said devices in the machine.

34. In a machine of the class described, the combination with a printing mechanism, of a plurality of detachable devices insertible into the machine to coöperate with said printing mechanism to effect the printing of records on record material, feeding means for the record material including a wheel having projections engaged by the detachable devices as the latter are moved in the machine, and means for moving said detachable devices in the machine.

35. In a machine of the class described, the combination with a plurality of detachable destination devices, each having a consecutive printing counter, and insertible into the machine to print on an audit strip, of feeding means for said audit strip, actuated by said destination devices when the latter are moved in the machine, and means for moving the destination devices in the machine.

36. In a machine of the class described, the combination with a plurality of detachable printing members insertible into the machine for printing on a record strip, of feeding means for the record strip actuated by the inserted printing members and impression means for causing the inserted printing members to print on the record strip during the feeding of the record strip.

37. In a machine of the class described, the combination with a printing mechanism including a record strip and impression means, of a plurality of detachable printing members insertible into the means for printing on the record strip, feeding means for the record strip actuated by movement of said printing members in the machine, and operating mechanism for moving said members in the machine so that the members actuate the feeding means and at the same time coöperate with the impression means to print on the record strip.

38. In a machine of the class described, the combination with a plurality of detachable destination devices, each having a consecutive printing counter, and insertible into the machine to print on an audit strip, of feeding means for said audit strip, actuated by said destination devices when the latter are moved in the machine, means for moving the destination devices in the machine and impression means for coöperating with said printing counters to print on the audit strip during the actuation of said feeding means.

39. In a machine of the class described, the combination with a printing mechanism, of a plurality of printing members insertible into the machine for printing on a record strip, feeding means for the record strip actuated by movement of the printing members in the machine, impression means for coöperating with the printing members to print on the record strip during the actuation of the feeding means, inking means for the printing members movable into and out of inking position, and operating mechanism and connections for moving the printing members in the machine and operating said printing means.

40. In a machine of the class described, the combination with a plurality of insertible detachable controlling members, of a main operating mechanism capable of having a variable period of uninterrupted operation dependent as to extent on the number of detachable members inserted into the machine, manipulative means, and a normally effective locking device for said operating mechanism rendered ineffective by said manipulative means and retained in ineffective position by the inserted detachable members during an operation of the main operating mechanism.

41. In a machine of the class described, the combination with a series of insertible recording devices, of a receiver constructed to receive a plurality of said devices, a manipulative device, a variably operable driving mechanism, and a lock controlled jointly by the manipulative device and the inserted devices for controlling the variable operations of the driving mechanism.

42. In a machine of the class described, the combination with a series of insertible recording devices, of a receiver constructed to receive a plurality of said devices, a variably operable driving mechanism, and a positive stop for said driving mechanism controlled by devices inserted into the receiver.

43. In a machine of the class described, the combination with a printing mechanism, of a plurality of printing members insertible into the machine for coöperating with the printing mechanism to print on record material, an oscillating arm and means for oscillating said arm, devices carried by and movable relative to said arm for engaging the printing device during movement of the arm in one direction whereby to feed the members through the printing mechanism, and means for moving said devices relative to the arm.

44. In a machine of the class described, the combination with a printing mechanism, of a plurality of printing members insertible into the machine for coöperating with the printing mechanism to print on record material, an oscillating arm and means for oscillating same, devices carried by and movable relative to said arm for engaging the printing members during movement of the arm in one direction whereby to feed the members through the printing mechanism, and means automatically controlling movements of said devices.

In testimony whereof I affix my signature in the presence of two witnesses.

HAAKON A. MARTIN.

Witnesses:
F. E. HAMILTON,
J. B. RICKETTS.